March 29, 1966   G. M. FULMER ET AL   3,243,193
HYDRAULICALLY OPERATED DEMOUNTABLE RUNNING GEAR
Original Filed Dec. 31, 1962   3 Sheets-Sheet 1
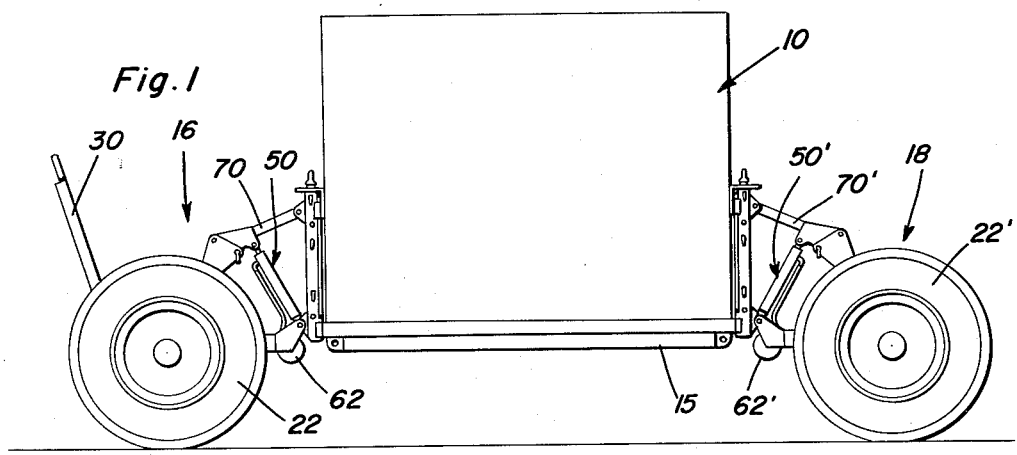
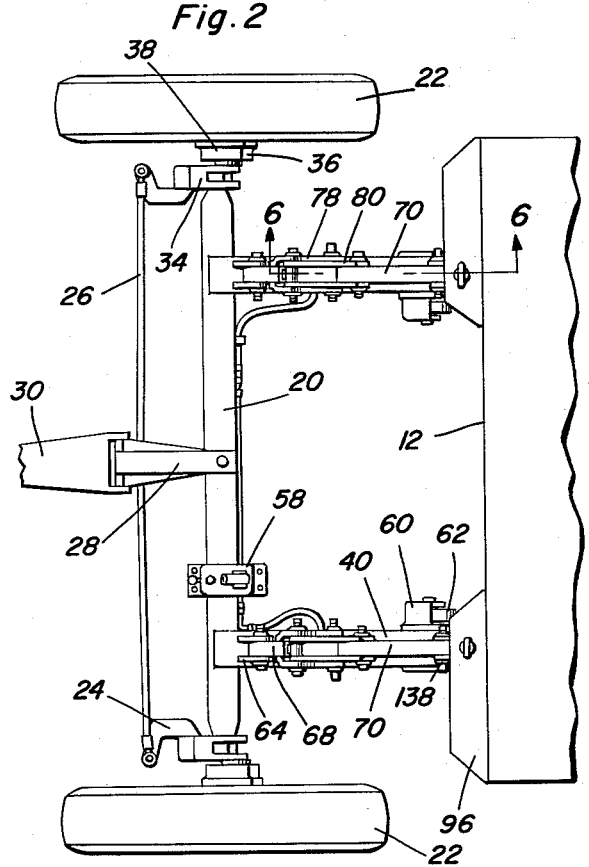
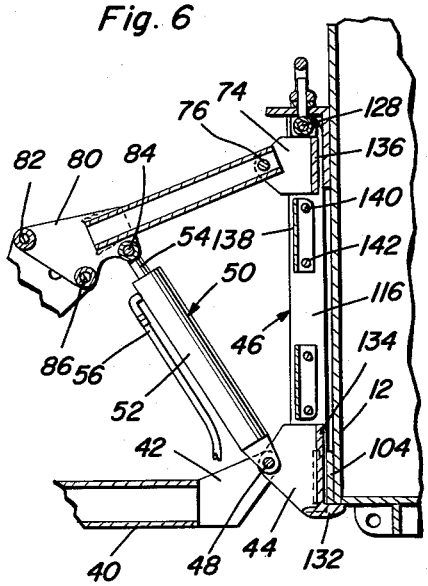
George M. Fulmer
Royal G. Bivins
INVENTORS.

March 29, 1966 G. M. FULMER ET AL 3,243,193
HYDRAULICALLY OPERATED DEMOUNTABLE RUNNING GEAR
Original Filed Dec. 31, 1962 3 Sheets-Sheet 2
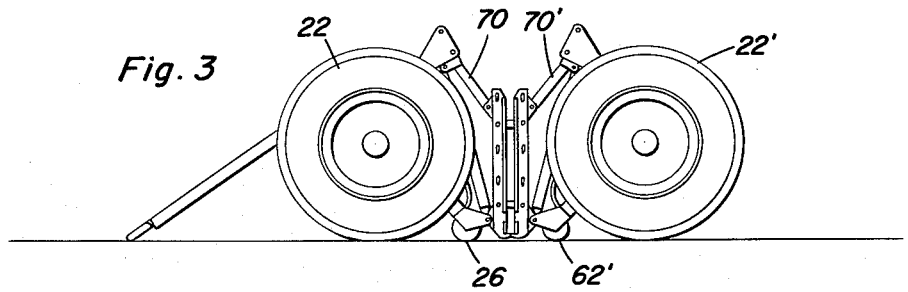
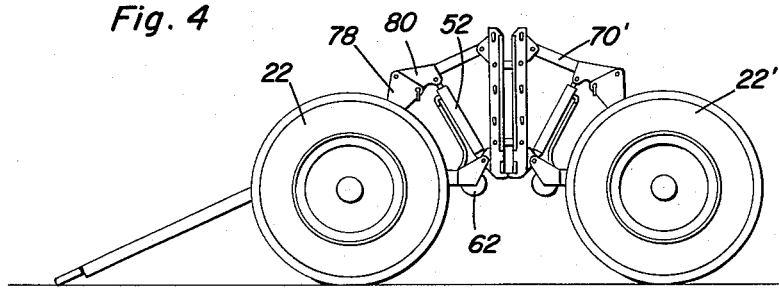
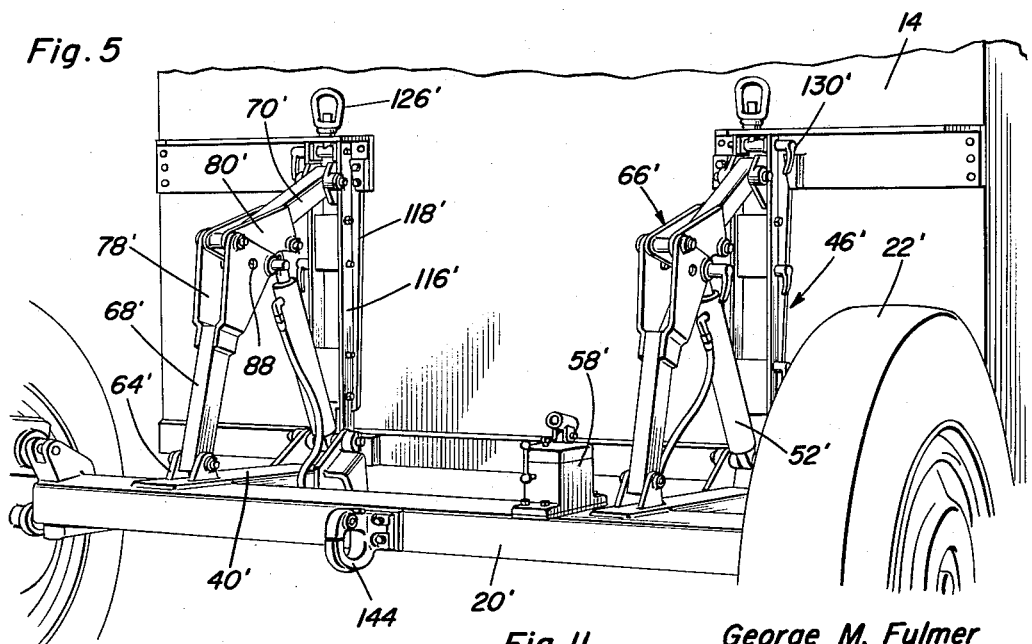
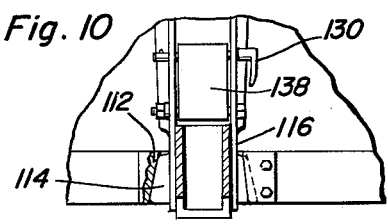
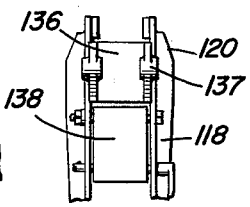
George M. Fulmer
Royal G. Bivins
INVENTORS.

March 29, 1966    G. M. FULMER ET AL    3,243,193
HYDRAULICALLY OPERATED DEMOUNTABLE RUNNING GEAR
Original Filed Dec. 31, 1962    3 Sheets-Sheet 3
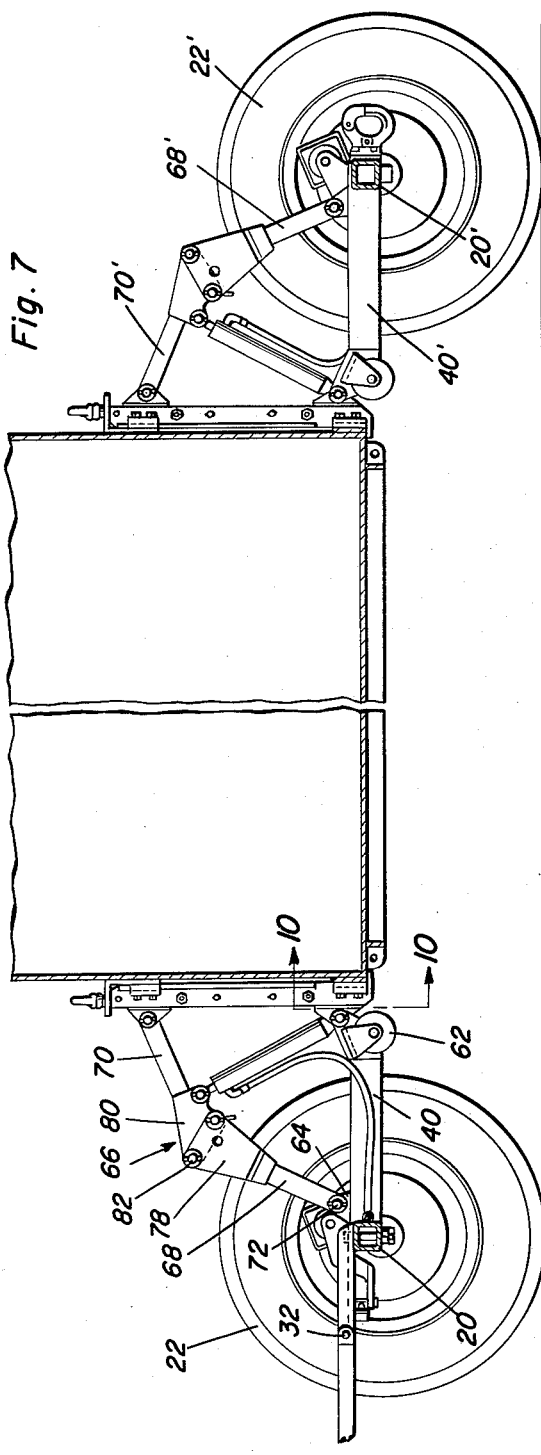
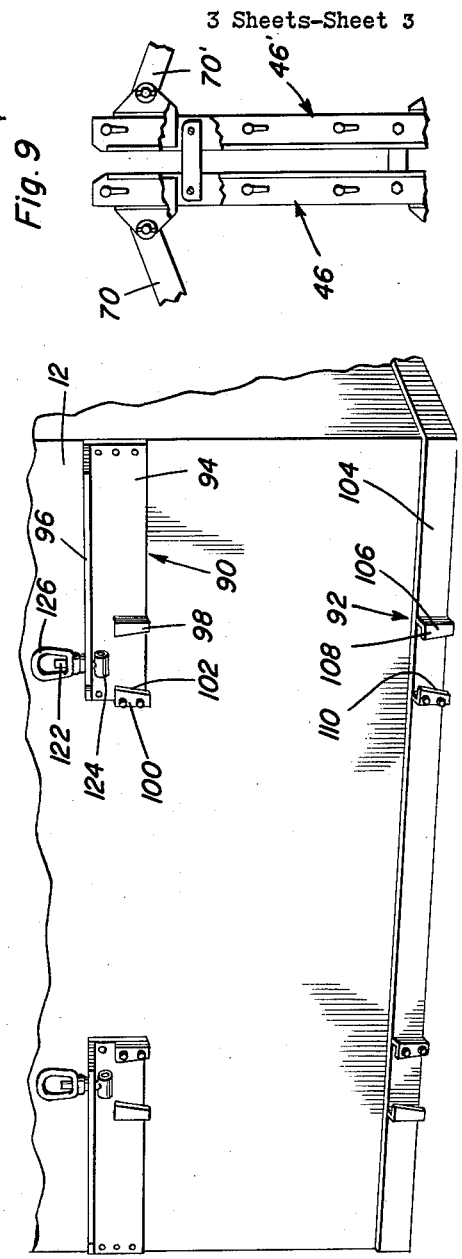
George M. Fulmer
Royal G. Bivins
INVENTORS.

United States Patent Office 3,243,193
Patented Mar. 29, 1966

3,243,193
HYDRAULICALLY OPERATED DEMOUNTABLE
RUNNING GEAR
George M. Fulmer, Silver Spring, and Royal G. Bivins, Chevy Chase, Md., assignors to Gichner Mobile Systems Inc., Beltsville, Md., a corporation of Maryland
Continuation of application Ser. No. 248,443, Dec. 31, 1962. This application July 2, 1964, Ser. No. 380,991
16 Claims. (Cl. 280—35)

The present invention generally relates to a demountable running gear for attachment to a body unit such as a shelter enclosure, a load carrying body or the like and more particularly to an improvement in that construction illustrated in prior Patent No. 2,968,490 issued January 17, 1961, for a Demountable Running Gear and this application is a continuation of copending application Serial No. 248,443, filed December 31, 1962, and now abandoned.

An object of the present invention is to provide a demountable running gear for a body unit of rigid construction and including at least a bottom wall, a forward wall and a rear wall orientated in rigid relation to each other for attachment of the running gear to the forward and rear wall respectively with the running gear including an improved and novel hydraulic means for elevating the body unit to which the running gear is attached from an at rest position on a floor or ground surface to an elevated position whereby the body unit may be rendered mobile for ease of transporting over various terrain by employing a suitable towing vehicle.

Another object of the present invention is to provide a demountable running gear for detachable engagement with a body unit with the employment of a vertical sliding interlocking connection between each unit of the running gear and the forward and rear walls of the body unit thereby reducing the time required for securely attaching and easily detaching the running gear in relation to the body unit.

Still another object of the present invention is to provide a running gear in accordance with the preceding objects in which the novel mechanism for orientating the running gear in proper orientation in relation to the body unit includes an articulated brace member extending across the space between the upper end of an upright member and the forward end of rearwardly extending arm having the upstanding member pivotally attached to the rear end thereof whereby a hydraulic piston and cylinder assembly extending between the rear portion of the arm and the articulated portion of the brace will enable the brace to be orientated either in a straight condition for orientating the arm and upright member in substantially perpendicular relation or enabling the upright member to pivot forwardly when the two sections of the articulated brace are orientated in angular relation to each other. The hydraulic operating means and articulated brace are substantially the same on both the front running gear unit and the rear running gear unit except that the orientation thereof is reversed.

Yet another object of the present invention is to provide a detachable running gear for a body unit such as a shelter enclosure or the like having a dependent wheel suspension with the wheels being resiliently connected with the axle assemblies by virtue of a rubber in shear suspension assembly.

Another feature of the present invention is the provision of a detachable running gear having means thereon for interconnection with the body unit so that it is only necessary to insert a locking pin for retaining the attaching plate or upright member of the running gear to the bracket assemblies attached to the body unit.

Still another feature of the invention is the provision of a running gear including a front wheeled assembly and a rear wheeled assembly together with means for detachably interconnecting the assemblies in short coupled relation thereby enabling them to be returned to a desired location after the body unit has been transported to a desired point.

Yet another important feature of the present invention is the provision of a detachable hydraulically operated running gear for body units, such as a shelter enclosure having steerable front wheels and being relatively simple in construction, easy to attach and detach, rugged and dependable in operation, and relatively inexpensive to manufacture, maintain and operate.

These together with other objects and advantages which will become subsequently apparent residue in the details of construction and operation as more fully hereinafter described an claimed, reference being had to the accompanying drawings forming a part hereof, wherein like numerals refer to like parts throughout, and in which:

FIGURE 1 is a side elevational view of the detachable running gear of the present invention associated with a body unit;

FIGURE 2 is a top plan view of the forward portion of the unit of FIGURE 1;

FIGURE 3 is a side elevational view illustrating the running gear in short coupled relation with the attached components thereof disposed in lowered condition;

FIGURE 4 is a side elevational view similar to FIGURE 3 but with the components thereof orientated in elevated position ready for transport;

FIGURE 5 is a fragmental perspective view of the rear of the running gear of the present invention illustrating the structural relationship of the components thereof;

FIGURE 6 is a detailed sectional view taken substantially upon a plane passing along section line 6—6 of FIGURE 2 illustrating the orientation of the components of the attaching plate and the articulated brace;

FIGURE 7 is a longitudinal sectional view of the present invention illustrating the orientation of the components in relation to the body unit;

FIGURE 8 is a fragmental perspective view illustrating the brackets attached to the forward or rear wall of the body unit;

FIGURE 9 is a detailed fragmental view with portions thereof broken away illustrating the construction of the mounting plates and the manner in which they are interconnected for short coupling;

FIGURE 10 is a detailed sectional view taken substantially upon a plane passing along section line 10—10 of FIGURE 7 illustrating the manner in which the mounting plates are connected with the bracket on the body unit; and FIGURE 11 is a detailed view of the upper end of the attaching plate.

Referring now specifically to the drawings, the numeral 10 generally designates the shelter enclosure or body unit which is carried by the running gear of the present invention. The shelter unit or body unit 10 is of conventional construction except for attaching brackets carried by the front wall 12 and the rear wall 14 thereof. The shelter unit may have sides and a top but must include a rigid bottom structure 15 in order that the front wall 12 and rear wall 14 be orientated in rigid parallel relation to each other and substantially perpendicular relation to the bottom structure 15. The running gear includes a front wheeled assembly or unit designated by numeral 16 and a rear wheeled assembly designated by numeral 18 with the assemblies being substantially the same except that the front assembly is steerable and the rear wheeled assembly 18 is not.

The front wheeled assembly 16 includes a transverse axle 20 which may be of any suitable hollow beam construction having a pair of wheels 22 mounted on the exterior ends of the axle 20 in a manner which enables the wheels 22 to rotate about a spindle disposed generally as an axial extension of the axle 20 when the wheels 22 are perpendicular thereto. The spindle is capable of pivoting about substantially a vertical axis defined by a kingpin and a steering arm 24 is attached to each of the wheel units for steering control thereof. Drag links 26 are connected to the steering arms 24 and are pivotally connected to a pivotal draw bar 28 attached to the center portion of the axle 20. A tongue 30 extends forwardly from the drawbar 28 and is pivoted thereto by virtue of the transverse pivot pin 32 for enabling changes and elevational relationship of the tongue 30. Thus, as the tongue and drawbar 28 are pivoted in an angular manner, the wheels 22 will be steered in a conventional manner.

Also, each end of the axle 20 is provided with a support arm 34 attached to the end of the axle and having the outer end thereof attached to a rubber block 36 that has one surface thereof bonded to a plate 38 carried by backing plate of the wheeled unit thereby employing the resistance of the rubber block 36 to shear to resiliently suspend the wheels 22 independently in relation to the axle 20.

Attached rigidly to the axle 20 and extending rearwardly therefrom is a pair of arms 40 which may be of tubular beam construction. The rear end of each arm 40 includes a pair of rearwardly and upwardly extending plates 42 which are spaced from each other for receiving therebetween flanges 44 carried by a mounting plate assembly 46. A transverse pivot pin 48 interconnects the rear ends of the arms 40 and the lower ends of the mounting plate assemblies 46. Also connected to the pin 48 is a hydraulic piston and cylinder assembly 50 including a cylinder 52 mounted on the pin 48 and a piston and piston rod assembly 54 extending outwardly from the opposite end of the cylinder 52. A hydraulic pressure line 56 is connected to the outer end portion of the cylinder 52 and extends to a manually operated hydraulic pump 58 mounted on the axle 20 whereby actuation of the pump 58 will cause retraction of the piston and cylinder assembly 50 and when the hydraulic pressure is released back to a reservoir, the piston and cylinder assembly 50 will be permitted to expand for lowering the body unit.

Attached to the inner surface of the rear ends of each arm 40 is a bracket 60 carrying a ground engaging roller 62 which has the lower edge thereof disposed below the lower surface of the arms 40 thereby forming a support for the wheeled unit when disposed in lowered condition as illustrated in FIGURE 3 thereby enabling the wheeled unit to be lowered and brought into engagement with the body unit without requiring manual lifting of the arms and attaching plates since the wheels 62 will engage the supporting surface and enable the unit to be maneuvered into registry with the body unit 10.

The front ends of each arm 40 is provided with a pair of upstanding lugs 64 for pivotally attaching the lower end of an articulated grace 66 which includes a lower section 68 and an upper section 70. The lower section 68 is attached to the lugs 64 by virtue of the pivot pin 72 for enabling pivotal movement of the lower section 68 in relation to the arms 40. The upper section 70 is pivotally attached to and between a pair of projecting flanges 74 on the upper end portion of the mounting plate assembly 46 by virtue of a pivot pin 76. The upper end of the lower section 68 of the articulated brace 66 is provided with a pair of generally triangular plates 78 attached thereto for pivotal connection with a pair of triangular plates 80 attached to the lower end of the upper section 70. A pivot pin 82 extends through and between the outer remote corners of the plates 78 and 80 thus interconnecting pivotally the lower section and the upper section of the articulated brace 66. The plates 78 and 80 together with the pin 82 may be considered to incorporate a knee joint interconnecting the sections 68 and 70 of the brace 66. For moving the brace with the sections generally in alignment with each other to a position with the sections in angular relation to each other, the upper end of the piston rod 54 is pivotally attached to the inner edge of the plates 80 by virtue of a pivot pin 84 as illustrated in FIGURE 6. Thus, by expanding the piston and cylinder unit 50, the sections 68 and 70 may be orientated in acute angular relation to each other as illustrated in FIGURE 3 and by contracting the piston and cylinder unit 50, the sections 68 and 70 may be orientated nearly in alignment with each other as illustrated in FIGURES 4 and 7. For retaining the sections 68 and 70 in their extended or nearly aligned position as illustrated in FIGURES 1, 4 and 7, there is provided a lock-out pin 86 which extends through aligned apertures in the plates 78 and 80. The plate 78 may have a plurality of apertures 88 therein arranged about the pivotal center formed by the pin 82 so that the orientation of the lower section 68 and the upper section 70 may be locked in several desired angular relations such as the fully extended position, a fully retracted position and any intermediate position desired.

As illustrated in FIGURE 8, the front or rear wall of the body unit is depicted with the wall being designated as the front wall 12. The front and rear wall are the same insofar as attaching brackets 90 and 92 are concerned. The attaching brackets 90 include a plate 94 attached to the front wall 12 with the upper edge of the plate 94 having an outwardly extending flange 96 integral therewith. Attached to the inner surface of the plate 94 is a pair of lugs 98 of angle shaped cross-sectional configuration with the inner edges of the outer flanges 100 of the lugs 98 being inclined and diverging upwardly as indicated by numeral 102. The bracket 92 is attached to the lower frame 104 of the body unit and includes a pair of lugs or brackets 106 of angle shaped cross-sectional configuration having the top flange 108 thereof terminating in inclined inner edges 110 with the inclined edges converging upwardly in the same manner as the edges 102. Thus, there is provided a pair of flanges which have the inner edges thereof inclined and also as illustrated in FIGURE 10, the portion of the flanges attached to the plate 94 and the frame 104 respectively are inclined at 112 for receiving and engaging projecting flanges 114 on the side rails 116 of the mounting plate assembly 46. The edges of the flanges 114 converge upwardly in the same manner as the edges of the inclined portion 112 and the edges 110 and 102 thereby enabling the flanges 114 to be disposed inwardly toward the wall 12 in relation to the flanges 108 and 100 and then moved upwardly into interlocking engagement behind the outer flanges 100 and 108 and in abutting engagement with the inclined surfaces 112 thereby providing a rigid interconnection between the side plates 116 and the brackets 90 and 92.

As illustrated, the side plates 116 have flanges 118 theeron which diverge upwardly and which terminate in spaced relation to the flanges 114. The upper ends of the flanges 118 are inclined inwardly in a converging manner as illustrated at 120 and these edges 120 correspond with the lower flanges 114 for interlocking engagement with the flanges 100 attached to the plates 94.

The flange 96 is provided with a bolt or pin 122 extending therethrough with the lower end of the pin 122 having a transverse tubular member 124 integral therewith. A retaining loop 126 is anchored to the pin 122 on the upper end thereof for forming attachment loops for lifting cables or the like and also providing a handle for manipulating the tubular member 124 about the axis of the pin or bolt 122. Rather than the pin 122 being a bolt, it is preferred that the loop 126 be attached in such a manner that the loop is capable of at least limited swivelling movement. The tubular member 124 is aligned with corresponding apertures in the side plates 116 and a retaining bolt or pin 128 is inserted therethrough thus locking the tubular member 124 between the side rails 116 of the mounting plate assembly 46. The bolt 128 is provided with an offset handle 130 on one end thereof for ease of manipulation. Rather than the member 128 being a bolt, it may be a pin having a suitable retaining means on the inner end thereof for retaining it in position. Thus, the mounting plate assembly will be retained in its interlocked relationship to the brackets 90 and 92 since the tubular member 124 will prevent vertical movement thereof until the pin 128 is removed.

The lower end of the side members 116 are interconnected by a flange 132 which extends under the corner frame member 104 and is rigidly affixed to the lower ends of the members 116 and may be a part of the flanges 44 which are interconnected by a plate member 134 rigidly affixed to the side rails 116. This construction may be conveniently welded together whereby the flanges 44, 134, transverse connecting member 132 and the side rails 116 become all one unit. Also, the flanges 74 are an integral part of the channel-shaped member having a plate 136 rigidly affixed thereto which may be welded to the side rails in the same manner. The flanges 74 conveniently terminate in angulated surfaces having an enlarged bearing area 137 for receiving the pin 76.

Also interconnecting the side rails 116 is a pair of connecting plates 138 of channel-shaped cross-sectional configuration which are mounted on a pivot bolt 140 at the upper and lower ends thereof respectively with the opposite ends being retained in place by a removable pin 142. The plates 138 may be pivoted into a perpendicular relationship for engagement with a rear attaching plate as illustrated in FIGURE 9 thus short coupling the wheeled assemblies in the manner illustrated in FIGURES 3 and 4 with suitable removable bolts or pins being employed for such interconnection. All retaining bolts or pins are secured in place by suitable locking devices to prevent any possible loosening or accidental removal due to vibrations and the like.

The rear wheeled assembly is the same as the front wheeled assembly except that the rear wheels are not steerable in relation to the axle. For purposes of identification, the same reference numerals are employed with the rear unit as with the front unit except the reference numerals depicting the components of the rear unit will be primed. The rear axle 20' has provided thereon an attachment 144 by which a plurality of the mobile units may be connected together or any other suitable device may be towed therebehind. The arms 40' extend forwardly and are pivotally attached to mounting unit assemblies 46' and the brace 66' extends between the upper end of the mounting plate assembly 46 and the rear ends of the arms 40' with the operation of the components being the same as in the front assembly as described in detail hereinbefore.

Each of the wheeled units may have various accessories incorporated therein such as hydraulic or pneumatic brakes, parking brakes, running lights, reflectors, and the like. The pump units may have pivotal handle receiving sockets thereon or the handles may be permanently attached thereto and wherever removable lock pins are provided, they are preferably tethered to the structure of the unit by either flexible cords or chains so that they will not become accidentally lost.

If desired, a safety cable may be extended between the front and rear axles under the body unit as a safety precaution in the event of dislodgement of the running gear. By using a pair of such cables, chains or the like, the body unit would be continued to be attached to the running gear even if the brackets failed or the running gear otherwise became detached.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A demountable running gear assembly for use with a body unit including a front wheeled assembly and a rear wheeled assembly, each assembly including an axle with wheel units carried by the outer ends thereof, each axle including a pair of laterally extending arms, an upright mounting plate assembly pivotally attached to the outer end of each arm, means on each mounting plate assembly for cooperation with the body unit to be transported for interlocking engagement therewith, and means interconnecting each arm adjacent the axle and the upper end of the mounting plate assembly for pivoting each of the mounting plate assemblies about a transverse axis for enabling each mounting plate assembly to be interlocked with the body unit while the outer ends of the arms are adjacent the ground surface and subsequently orientating the mounting plate assemblies in substantially perpendicular relation to the arms for elevating the body unit to a transportable condition, said interconnecting means including an articulated brace having a centrally disposed pivotal connection, and a fluid pressure operated piston and cylinder assembly connected with the articulate connection in the brace for selectively orientating the brace with the sections thereof in substantial alignment or in acute angular relation thereby enabling the mounting plate assembly to be orientated in adjustable position in relation to the arm.

2. The structure as defined in claim 1 together with a small wheel mounted on the outer end of each arm for rollingly engaging a ground surface to facilitate the assembly of the running gear with the body unit.

3. The structure as defined in claim 1 wherein said interlocking means between the body unit and each mounting plate assembly includes a pair of side rails, flanges on said side rails, said flanges having upwardly converging edges, the body unit having vertically spaced brackets thereon, each bracket including inwardly extending flanges with upwardly converging surfaces for interlocking engagement with the flanges on the mounting plate assembly.

4. The structure as defined in claim 1 wherein said wheel units mounted on each end of the axle are independently suspended by the use of rubber in shear for resiliently suspending the wheel units in relation to the axle, the wheel units on the ends of the front axle being steerable for controlling the directional path of the running gear and body unit.

5. The structure as defined in claim 1 wherein the other end of said piston and cylinder assembly is connected to the point of attachment of the mounting plate assembly to the arm.

6. The structure as defined in claim 5 wherein a manually operated hydraulic pump is mounted on the axle in communication with the piston and cylinder assembly.

7. The structure as defined in claim 1 wherein one of said mounting plate assemblies includes a pivotal link for interconnection with another mounting plate assembly for short coupling a front and rear wheeled assembly.

8. The structure as defined in claim 1 wherein a removable lock pin means releasably secures the mounting plate assemblies to the body unit and prevents vertical movement.

9. In a demountable running gear assembly used in combination with a body unit including a front wheeled assembly and a rear wheeled assembly with each assembly including an axle with wheel units carried by the outer ends thereof and the axle having a pair of laterally extending arms, an upright plate pivotally attached to the outer end of each arm, means on the plate for mounting on the body unit, that improvement comprising a pair of brace members interconnecting the arms and plates in spaced relation to the pivotal connection therebetween, and means connected to the brace members at their points of connection for selectively orientating the brace members in alignment or in folded condition for enabling pivotal movement of the plates in relation to the arms thus enabling raising and lowering of the body unit.

10. A structure as defined in claim 9 wherein said means connected to the brace members is attached pivotally to the point of connection between the plate and arm in generally bisecting relation to the angle included therebetween.

11. The structure as defined in claim 10 wherein said means connected to the brace members is attached pivotally to the pivotal interconnection between the brace members.

12. A demountable running gear for a body unit having an axle and a laterally extending arm adapted to be attached to the body unit, the improvement comprising a linkage assembly having one end thereof connected with the arm in spaced relation to the end thereof adapted to be connected to the body unit, means at the other end of the linkage assembly adapted to engage the body unit in spaced relation to the point of connection between the body unit and arm, and hydraulically operated means operatively associated with the linkage assembly and applying force at a point adjacent the point of attachment of the arm to the body unit for varying the angular relationship between the arm and body unit for raising and lowering the body unit.

13. A transporting unit for elevating and transporting a load unit comprising a pair of rotatable wheels, a frame assembly disposed between the wheels and supporting the wheels generally in parallel relation and in turn being supported thereby, said frame assembly including a portion extending laterally of an axis defined by the rotational axis of the wheels and having means thereon for articulate attachment to a load unit in laterally spaced relation to the axis between the wheels, power operated means having an upper end operatively associated with the load unit above the point of engagement between the load unit and frame assembly and also operatively associated with the frame assembly at a point adjacent to but spaced from the point of engagement between the frame assembly and load unit for applying forces at the opposite ends thereof to rotate the frame assembly about an axis defined by the articulate connection between the frame assembly and the load unit and about an axis defined by the rotational axis of the wheels thereby elevating the load unit for transport thereof.

14. The structure as defined in claim 13 wherein said load unit includes a vertically disposed attaching surface forming a rigid relationship between the point of attachment of the frame assembly and the load unit and the point of association of the power operated means with the load unit above the point of attachment between the frame assembly and the load unit whereby application of force at the point of operative association between the power operated means and the load unit will cause relative pivotal movement between the load unit and frame assembly.

15. The structure as defined in claim 13 wherein said power operated means includes a linkage assembly pivotally connected to the frame assembly intermediate the axis of rotation of the wheels and the axis of articulate connection between the frame assembly and the load unit and adapted to be connected to the load unit above the point of connection between the load unit and the frame assembly, and a piston and cylinder assembly operatively connected to the linkage assembly and the frame assembly for causing effective shortening and lengthening of the linkage assembly.

16. The structure as defined in claim 15 wherein said linkage assembly includes a pair of brace members hingedly interconnected at adjacent ends thereof and pivotally connected to the frame assembly at one end and adapted to be pivotally connected to the load unit at the other end, said piston and cylinder assembly being connected to the brace members adjacent the pivotal interconnection therebetween for applying force thereto to selectively align the brace members or permit the brace members to fold into angular orientation to each other.

References Cited by the Examiner

UNITED STATES PATENTS 2,968,490   1/1961   Baus _____ 280—35

FOREIGN PATENTS 872,432   4/1953   Germany.

ARTHUR L. LA POINT, *Primary Examiner.*

C. W. HAEFELE, *Assistant Examiner.*